Nov. 18, 1924. 1,516,387
G. A. KELLERSTEDT
MICROMETER
Filed April 15, 1922   2 Sheets-Sheet 1
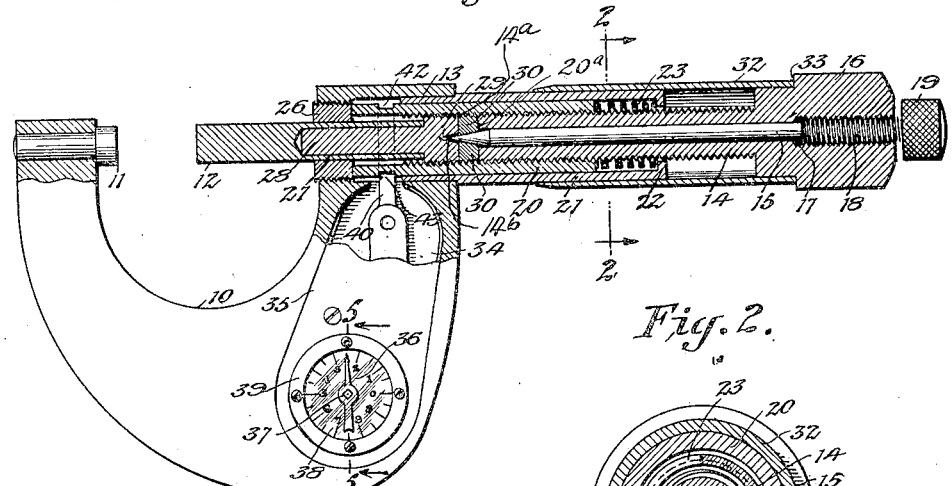
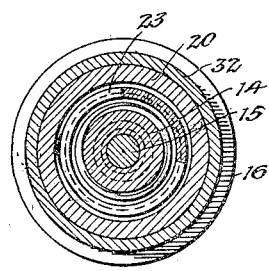
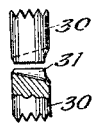
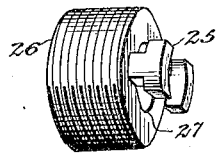
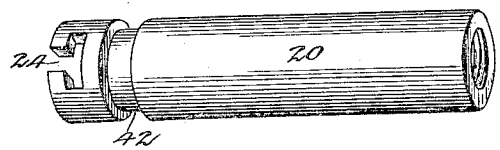
WITNESSES
INVENTOR
Gustaf A. Kellerstedt
BY
ATTORNEYS Nov. 18, 1924.                                                      1,516,387
                        G. A. KELLERSTEDT
                            MICROMETER
                    Filed April 15, 1922      2 Sheets-Sheet 2

WITNESSES

INVENTOR
Gustaf A. Kellerstedt
BY
ATTORNEYS

Patented Nov. 18, 1924.

1,516,387

UNITED STATES PATENT OFFICE.

GUSTAF A. KELLERSTEDT, OF NEW BRITAIN, CONNECTICUT.

MICROMETER.

Application filed April 15, 1922. Serial No. 552,946.

*To all whom it may concern:*

Be it known that I, GUSTAF A. KELLERSTEDT, a citizen of the United States of America, and a resident of New Britain, in the county of Hartford and State of Connecticut, have invented a new and Improved Micrometer, of which the following is a description.

My invention relates to micrometer calipers and has for its general object to provide a visual indicating means responsive to the adjustments of the micrometer spindle.

A further object is to provide novel means for actuating the indicating means and a novel and convenient means to lock the parts in a given adjustment.

The nature of the invention and its distinguishing features and characteristics will clearly appear as the description proceeds.

Reference is to be had to the accompanying drawings forming a part of this specification, it being understood that the drawings are merely illustrative of one example of the invention.

Figure 1 is a partly sectional side elevation of a micrometer calipers embodying my invention;

Figure 2 is an enlarged cross section on the line 2—2, Figure 1;

Figure 7 is a partly sectional side edge elevation of the locking dogs for holding the adjusting means in given adjustment;

Figure 8 is a perspective view of a nut fitted in the U-shaped frame of the micrometer and affording axial movement for the micrometer spindle;

Figure 9 is a perspective view of the sleeve or elongated floating nut forming part of the adjusting means.

Figure 3:
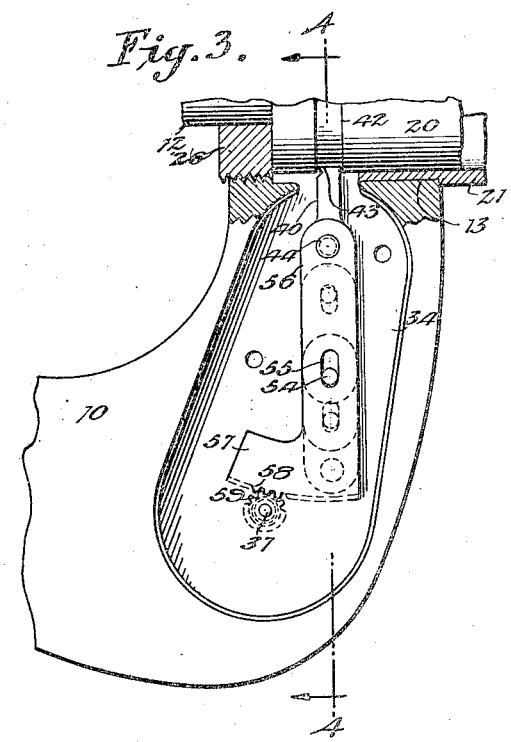
Figure 3 is a detail partly in section and partly in side elevation showing the lever system for turning the spindle of the indicating pointer.
Figure 4:
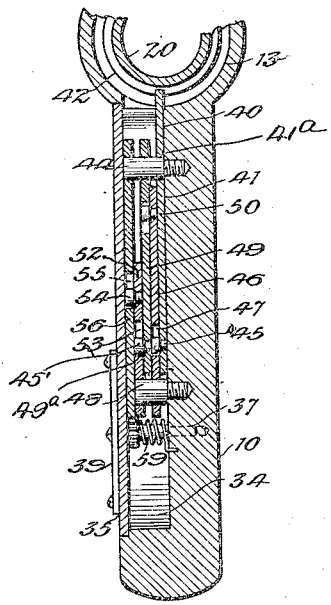
Figure 4 is a transverse vertical section on the line 4—4, Figure 3.

In the illustrated example of my invention 10 indicates the frame of the micrometer of general U-shape as is customary, and 11, the anvil. The spindle 12 having movement toward and from the anvil 11 is supported and actuated by members disposed in the bore 13 of that arm of the frame 10 opposite the terminal arm carrying the anvil 11.

In accordance with my invention an externally threaded shank 14 is provided having a through-bore receiving an elongated locking spindle 15. The shank 14 has an enlarged head 16 in which head the rear end of the bore of the shank 15 is enlarged and threaded as at 17 to receive the threaded portion 18 of the spindle 15. On the rear end of the spindle 15 is a milled head 19 for turning the same in the head 16 and a shank 14.

The external threads of the shank 14 engage the internal threads on a sleeve or elongated nut 20 which is turnably mounted in a cylinder 21 tightly fitted in the bore 13 and extending rearwardly from the frame 10. The rear end of the cylinder 21 has an annular flange 22 directed radially inward to form a bearing for a spring 23 which is coiled about the shank 14, between said flange 22 and the rear end of the elongated nut 20.

At the front end the nut 20 has diametrically opposite T-shaped slots 24 extending from the front edge of said nut, said slots being adapted to receive T-shaped projections 25 on an externally threaded plug 26 having an axial bore 27 receiving the spindle 12. The threads on the plug 26 and the threads of the nut 20 are of different pitch those on said plug being the finer threads. The slots 24 have a dimension lengthwise of the nut 20 greater by .002 inch than the length of the projections 25 so that the T-heads of said projections may have a play in the slots 24 to the extent of .002 inch.

The rear end of the spindle 12 is made tubular and receives with a press fit the reduced end 28 of shank 14. In a transverse bore 14$^a$ of shank 14 are disposed locking dogs 30 having tapered recesses 31 in their opposed inner ends adapted to be engaged by the tapered front end of the locking spindle 15 for separating said locking dogs 30 and causing the same to engage the threads of the nut 20 for locking the parts in a given adjustment. The extreme end of locking spindle 15 is received in a tapered recess 14$^b$ in shank 14 at the forward side of the transverse bore 14$^a$.

Arranged on the cylinder 21 and tightly secured on the reduced forward end of the head 16 is a shell or casing 32, the rear end of which abuts against a forwardly disposed shoulder 33 on said head 16.

Figure 6:
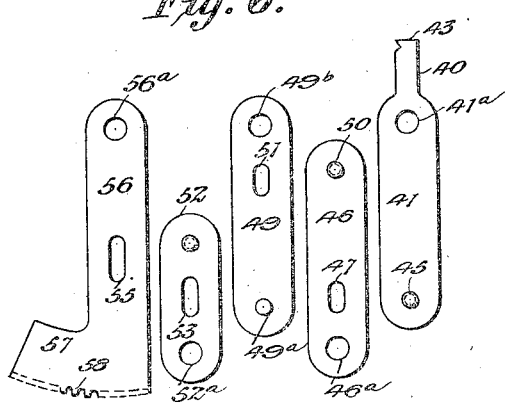
Figure 6 shows in side elevation, the several levers for operating the pointer spindle.
Figure 5:
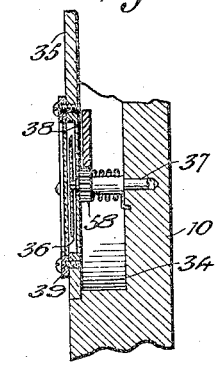
Figure 5 is a transverse vertical section on the line 5—5, Figure 1.

Means is provided to indicate the adjustments of the micrometer, said means in the form shown being as follows: The frame 10 has a lateral recess 34 in the rear arm thereof over which is a cover plate 35, said plate having a pointer 36 on a spindle 37, the pointer turning over a dial 38. An auxiliary cover plate 39 on the cover 35 is disposed over the pointer and dial. The pointer is actuated from the nut 20 by a system of levers as follows: The reduced end 40 of a lever 41 extends into an annular groove 42 in the nut 20 to be subject to the axial movements of the latter, said reduced end having a point contact with a side of the groove through the medium of a tooth 43 on said reduced end. A fulcrum pin 44 projecting into the recess 34 extends through a hole 41ᵃ in lever 41 adjacent to the reduced end 40. Said lever 41 near the opposite end has connection by a pivot pin 45 with a second lever 46, the pin 45 being enlarged at the lever 46 and being disposed in a slot 47 thereof. The lever 46 is fulcrumed on a pin 48 at that end of the lever opposite the fulcrum of the lever 41 and said lever 46 has a pivotal connection by a pin 50 with a third lever 49, the pin 50 being enlarged at the lever 49 and disposed in a slot 51 of lever 49. Said lever 49 is fulcrumed on the pin 44, that is to say, at the end at which the first lever 41 is pivoted. The lever 49 at the end opposite the fulcrum has slot 49ᵃ accommodating the small end of a pivot pin 45ᵃ which has a large section extended into a slot, 53, in the fourth lever 52 of the series, and said lever 52 is fulcrumed on the same pin 48 with the second lever 46, that is, at the opposite end from the first and third levers. The lever 52 furthermore has a pivot pin 54 the enlarged end of which lies in a slot 55 in the fifth and last lever 56 of the series, said lever 56 being fulcrumed on the pin 44. Thus, the first, third and fifth levers are fulcrumed at one end while the second and fourth levers are fulcrumed on the pin 48 at the opposite end, the fulcrum pins 48 and 44 being fixed. The fulcrum pin 44 is received in the holes 41ᵃ, 49ᵇ and 56ᵃ of the levers 41, 49 and 56 while the pin 48 is received in holes 46ᵃ and 52ᵃ of the levers 46 and 52. The character 49ᵃ in Figure 6 indicates the hole through which the pivot 45ᵃ passes. The fifth, or last lever 56, has an arcuate arm 57 formed with rack teeth 58 meshing with a pinion 59 on the spindle 37 of the pointer 36. The system of levers results in micrometric movement of the pointer 36 corresponding with the adjustment of the micrometer spindle 12.

With a micrometer calipers constructed as described if the locking spindle 15 be moved into the forward position with the dogs, 30, engaging the nut 20, then the head 16, its shank 14, with its terminal end 28 as well as nut 20 and the tightly fitting spindle 12 will all turn together so that there will be no differential movement of the plug 26 and nut 20, the turning of the plug 26 in the bore 13 of frame 10 determining the longitudinal movement of the assemblage. With the spindle 15 in the rearmost position and the dogs 30 released from the nut 20 the shank 14 may be fed forwardly and move the spindle 12 through the plug 26 for approximate adjustment, a finer adjustment being effected by the plug 26 when the dogs 30 have locked the shank 14 and nut 20 together. A micrometric adjustment of .002 inch may be obtained by a forward movement of the spindle 12 against the work to be gaged after the dogs 30 have been locked. This is so because the spindle 12 and nut 20 may move toward the spring 23 and compress said spring to the extent of the play permitted between the lugs 25 and the opposed surface presented by the slots 24, and the said movement .002 inch will be registered by the pointer 37 and dial 38 owing to the engagement of the nut 20 with the first lever 40 of the system of levers.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A micrometer including a frame, a spindle movable axially in the frame, an externally threaded plug through which said spindle passes, said plug having threaded engagement with said frame, a cylinder attached to the frame, an elongated nut in said cylinder, connections between said elongated nut and said plug, an actuating element for said spindle, and means to optionally lock said actuating means to said nut or to cause turning of said nut and the plug or permit independent forward movement of the actuating means and spindle.

2. A micrometer including a frame, a spindle movable axially in the frame, an externally threaded plug through which said spindle passes, said plug having threaded engagement with said frame, a cylinder attached to the frame, an elongated nut in said cylinder, connections between said elongated nut and said plug, an optionally turnable spindle-actuating element engaging the threads of said nut, and optionally operable means to lock said nut and said actuating element.

3. A micrometer including a frame, a micrometer spindle movable axially, a plug in threaded engagement with the frame, through which plug said spindle passes, a cylinder on said frame, an elongated nut in said cylinder and operatively connected with said plug to turn the latter, a spring between one end of the nut and one end of said cylinder, an actuating element having external threads in engagement with the threads of said nut and adapted to move said spindle, a spindle extending longitudinally in said actuating element, and means controllable by said second-mentioned spindle to lock the nut and actuating element.

4. A micrometer including a frame, a micrometer spindle movable axially, a plug in threaded engagement with the frame through which plug said spindle passes, a cylinder on said frame, an elongated nut in said cylinder and operatively connected with said plug to turn the latter, a spring between one end of the elongated nut and one end of said cylinder, an actuating element having external threads in engagement with the threads of said nut and adapted to move said spindle, a spindle extending longitudinally in said actuating element, and locking means for said element and nut and controllable by said second-mentioned spindle; together with indicating means subject to the longitudinal movements of said nut.

5. A micrometer including a frame carrying an anvil at one end, a micrometer spindle movable axially in said frame through the opposite end, an externally threaded plug through which plug the spindle passes, a cylinder secured in the frame, an elongated nut in said cylinder, said nut having transverse T-shaped slots and said plug having T-shaped projections accommodated in said slots, and an actuating element for said spindle having threaded engagement with the nut, the threads of the nut and the threads of the plug being of different pitch.

6. A micrometer including a frame, a micrometer spindle movable axially in said frame, an externally threaded plug through which the spindle passes, a cylinder secured in the frame, an elongated nut in said cylinder, said nut having transverse T-shaped slots and said plug having T-shaped projections accommodated in said slots, an actuating element for said spindle having threaded engagement with the nut, the threads of the nut and the threads of the plug being of different pitch, and means for locking the actuating means and nut.

7. A micrometer including a frame, a micrometer spindle movable axially in said frame, an externally threaded plug through which the spindle passes, a cylinder secured in the frame, an elongated nut in said cylinder, said nut having transverse T-shaped slots and said plug having T-shaped projections accommodated in said slots, an actuating element for said spindle having threaded engagement with the nut, the threads of the nut and the threads of the plug being of different pitch, means for locking the actuating means and nut, and indicating means operable by the movements of said nut.

8. A micrometer including a frame provided with an anvil at one end, a spindle passing through the other end and movable toward or from said anvil, actuating elements adapted to directly move said spindle, an inwardly-threaded sleeve surrounding said actuating elements, locking means within said sleeve for causing said sleeve to turn with the actuating element, and an outwardly-threaded nut interlocked with said threaded sleeve for permitting a longitudinal movement of said sleeve in unison with the spindle for a finer adjustment of the micrometer.

9. A micrometer including an anvil, a spindle movable toward and from the anvil, actuating elements adapted to directly move said spindle, actuated means, and means to lock or unlock the actuating element and said actuated means for optionally operating the spindle directly, or indirectly through said actuated means, said actuated means comprised of two elements one having means to engage the other member and turn the same, the said members of the actuated means being capable of a relatively longitudinal micrometric movement.

10. A micrometer including a frame having an anvil, a micrometer spindle movable toward and from said anvil, a plug threaded in said frame, through which plug said spindle may have movement, actuating means to move the spindle independently of said plug, and means to cause said actuating means and plug to turn as one so that the turning of said plug determines the longitudinal movement of the spindle.

11. A micrometer including a frame provided with an anvil, a micrometer spindle movable toward and from said anvil, two connected turnable elements outside of said spindle, the connection between said elements permitting micrometric axial movement of one member relatively to the other, and means to turn said members.

12. A micrometer including a frame provided with an anvil, a micrometer spindle movable to and from said anvil, two connected turnable elements outside of said spindle, the connection between said elements permitting micrometric axial movement of one member relatively to the other, means to turn said members, means to advance or retract said spindle when said members are turned in unison, and indicating means to register a micrometric relative movement of said members.

13. A micrometer including a frame provided with an anvil at one end, a micrometer spindle through the other end of said frame, two connected turnable elements outside of said spindle, the connection between said elements permitting micrometric axial movement of one member relatively to the other, actuating means for turning said members, means to cause advance or retraction of the said spindle by the turning of said members, and means to optionally lock the actuating means to said members for all to turn in unison or to unlock the actuating means and members, said actuating means when unlocked being adapted to directly move said spindle independently of said members.

14. A micrometer including an anvil thereon, a spindle movable toward and from the anvil, means to actuate said spindle, said actuating means including a nut, means to move said nut toward or away from said anvil, means to impart micrometric movements to the said spindle by the movements of said nut, and indicating means operable with the movements of said nut.

15. A micrometer including a spindle, a frame provided with an anvil, actuating means to move the spindle of the micrometer toward or from the anvil, an indicating dial, a pointer movable over said dial, and a system of levers adapted to turn said pointer and arranged to be subject to said actuating means; alternate levers being fulcrumed at opposite ends and having pivotal connections one with another, the pivots of certain levers extending into a slot of one of the adjacent levers.

16. A micrometer comprising a spindle, a frame provided with an anvil, actuating means for the spindle of the micrometer toward or from the anvil, said means including an element having an annular groove, an indicating dial, a pointer movable over said dial, and a system of levers to turn said pointer, the first of said levers having a member projecting into said annular groove.

17. A micrometer including a spindle, a frame provided with an anvil, adjusting means to move the spindle of the micrometer toward or from said anvil, an indicating dial, a pointer movable over said dial, and a system of levers adapted to turn said pointer and arranged to be actuated by the adjusting means; alternate levers being fulcrumed at opposite ends and having pivotal connections one with another, the pivots of adjacent levers extending into a slot of one of the adjacent levers, the final lever of the series having a lateral arm formed with arcuate rack teeth and the spindle of the pointer having a pinion meshing with said rack teeth.

GUSTAF A. KELLERSTEDT.